US012759525B2

(12) United States Patent
Kotaka et al.

(10) Patent No.: US 12,759,525 B2
(45) Date of Patent: Oct. 13, 2026

(54) HYDRAULIC PRESSURE DIAGNOSTIC DETECTION FOR A VEHICLE

(71) Applicant: Robert Bosch GmbH, Stuttgart (DE)

(72) Inventors: Mikiya Kotaka, Kanagawa (JP); Yuki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 538 days.

(21) Appl. No.: 18/260,260

(22) PCT Filed: Dec. 17, 2021

(86) PCT No.: PCT/IB2021/061965
§ 371 (c)(1),
(2) Date: Sep. 13, 2023

(87) PCT Pub. No.: WO2022/149030
PCT Pub. Date: Jul. 14, 2022

(65) Prior Publication Data
US 2025/0018917 A1 Jan. 16, 2025

(30) Foreign Application Priority Data
Jan. 7, 2021 (JP) ................................ 2021-001171

(51) Int. Cl.
*B60T 17/22* (2006.01)
*B60T 13/16* (2006.01)
(Continued)

(52) U.S. Cl.
CPC ............ *B60T 17/22* (2013.01); *B60T 13/161* (2013.01); *B60T 13/167* (2013.01); *B60T 13/18* (2013.01);
(Continued)

(58) Field of Classification Search
CPC .... B60T 13/686; B60T 13/662; B60T 13/161; B60T 13/167; B60T 13/18; B60T 17/22; F15B 7/06; F15B 19/00
See application file for complete search history.

(56) References Cited

U.S. PATENT DOCUMENTS 5,884,986 A * 3/1999 Shimizu ................ B60T 8/4275 303/122.1
7,267,411 B2 * 9/2007 Nishikawa ............. B60T 8/261 303/9.64
(Continued)

FOREIGN PATENT DOCUMENTS

JP H11334569 A 12/1999
JP 2008001291 A 1/2008
(Continued)

OTHER PUBLICATIONS

International Search Report and Written Opinion for Application No. PCT/IB2021/061965 dated Apr. 4, 2022 (9 pages).

*Primary Examiner* — Gonzalo Laguarda
(74) *Attorney, Agent, or Firm* — Michael Best & Friedrich LLP

(57) ABSTRACT

The present invention obtains a hydraulic pressure control unit capable of appropriately detecting abnormality in a hydraulic pressure control unit.

In a hydraulic pressure control unit (5) according to the present invention, a controller (52) includes a diagnosis section that executes a diagnostic mode to diagnose presence or absence of abnormality in the hydraulic pressure control mechanism (51) on the basis of a current fluctuation of a motor (35) in a state where a pump (34) is driven by the motor (35).

8 Claims, 8 Drawing Sheets

(51) Int. Cl.

| | |
|---|---|
| ***B60T 13/18*** | (2006.01) |
| ***B60T 13/68*** | (2006.01) |
| ***F15B 7/06*** | (2006.01) |
| ***F15B 19/00*** | (2006.01) |

(52) U.S. Cl.

CPC .............. *B60T 13/686* (2013.01); *F15B 7/06* (2013.01); *F15B 19/00* (2013.01); *F15B 2211/521* (2013.01)

(56) References Cited

U.S. PATENT DOCUMENTS

| | | | | |
|---|---|---|---|---|
| 10,513,249 | B2 * | 12/2019 | Kim | B60T 13/146 |
| 10,583,819 | B2 * | 3/2020 | Kim | B60T 8/4081 |
| 2019/0359192 | A1 | 11/2019 | Ohtaka | |
| 2023/0373452 | A1 * | 11/2023 | Ikeda | B60T 13/686 |
| 2024/0246518 | A1 * | 7/2024 | Jo | B60T 13/686 |
| 2025/0256692 | A1 * | 8/2025 | Ikeda | G01R 31/2829 |

FOREIGN PATENT DOCUMENTS

| | | | |
|---|---|---|---|
| JP | 2018008674 | A | 1/2018 |
| JP | 2019202597 | A | 11/2019 |

* cited by examiner

[FIG. 1]
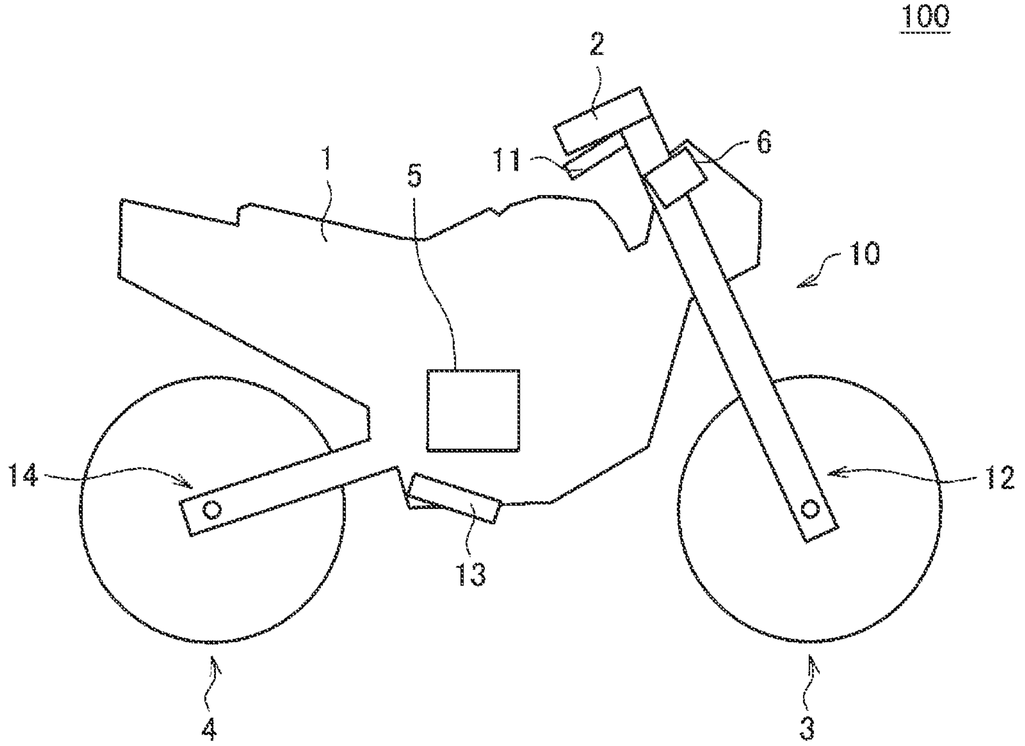

[FIG. 2]
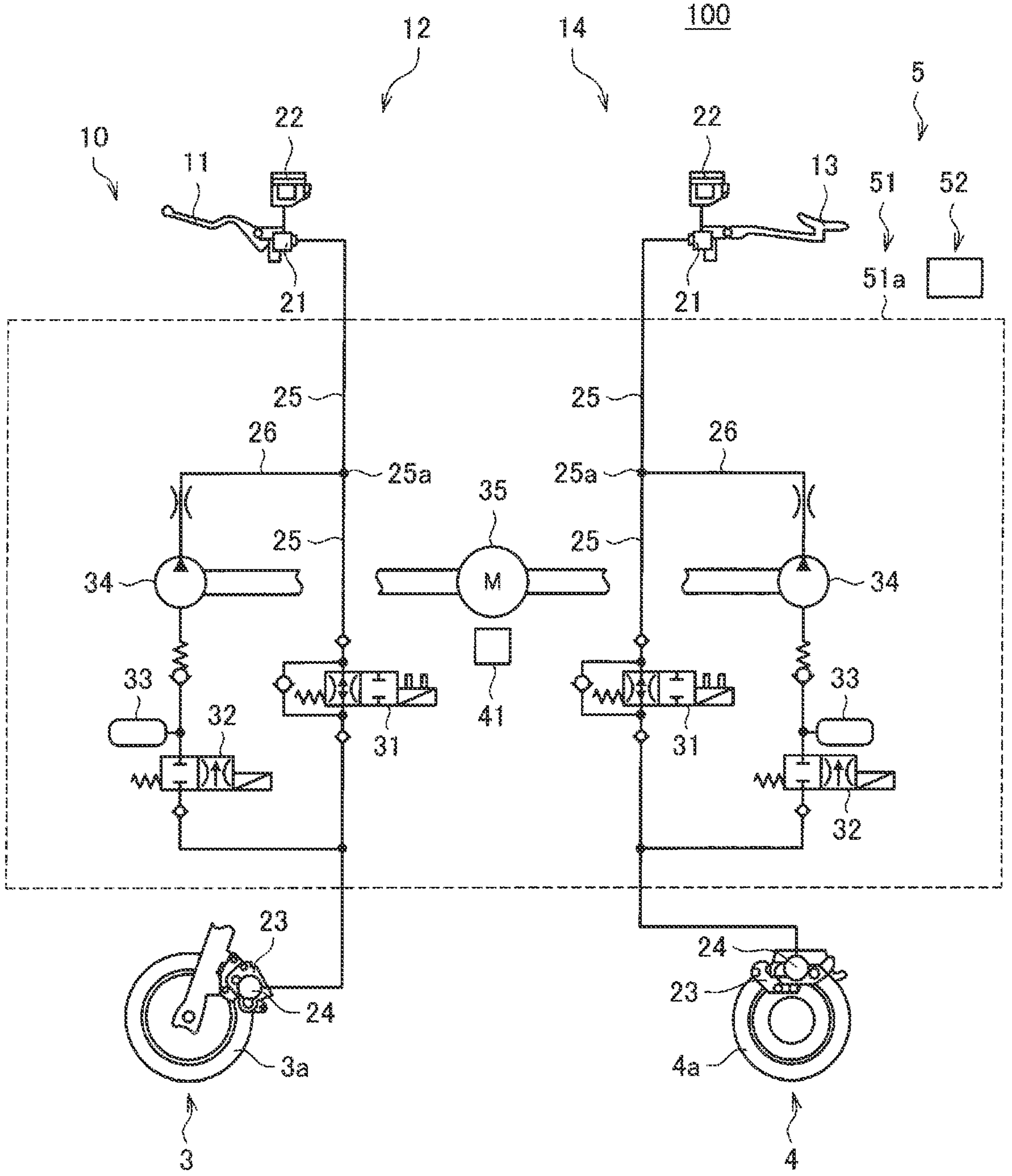

[FIG. 3]
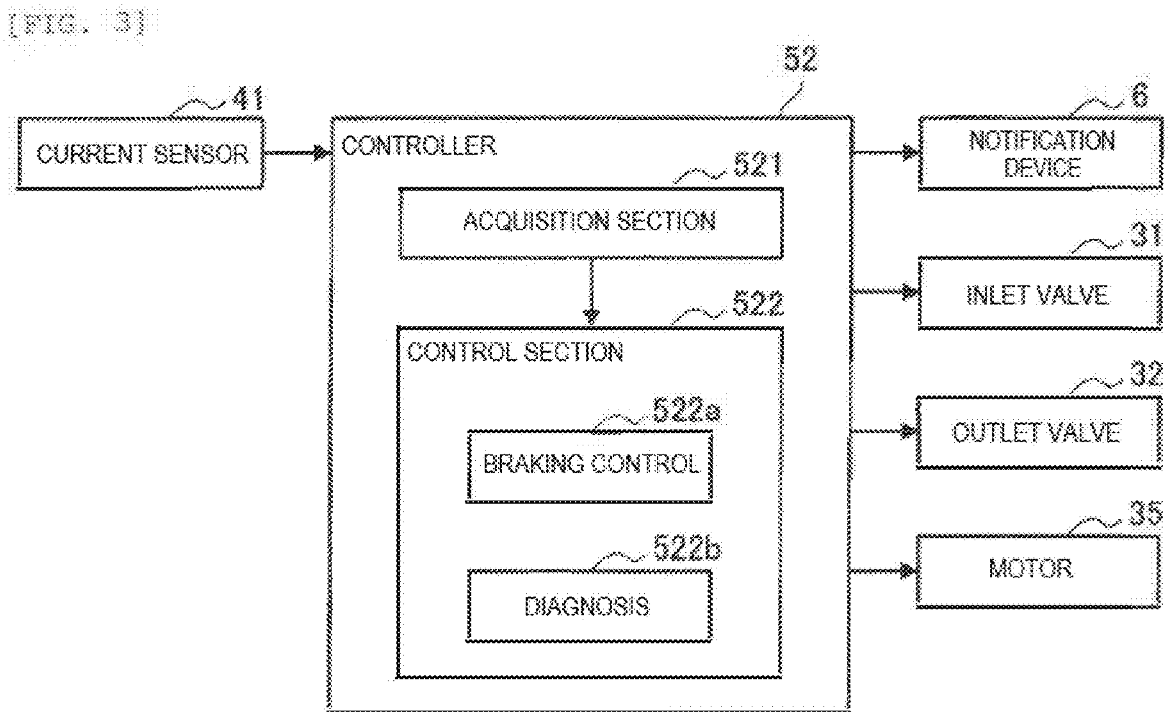
[FIG. 4]
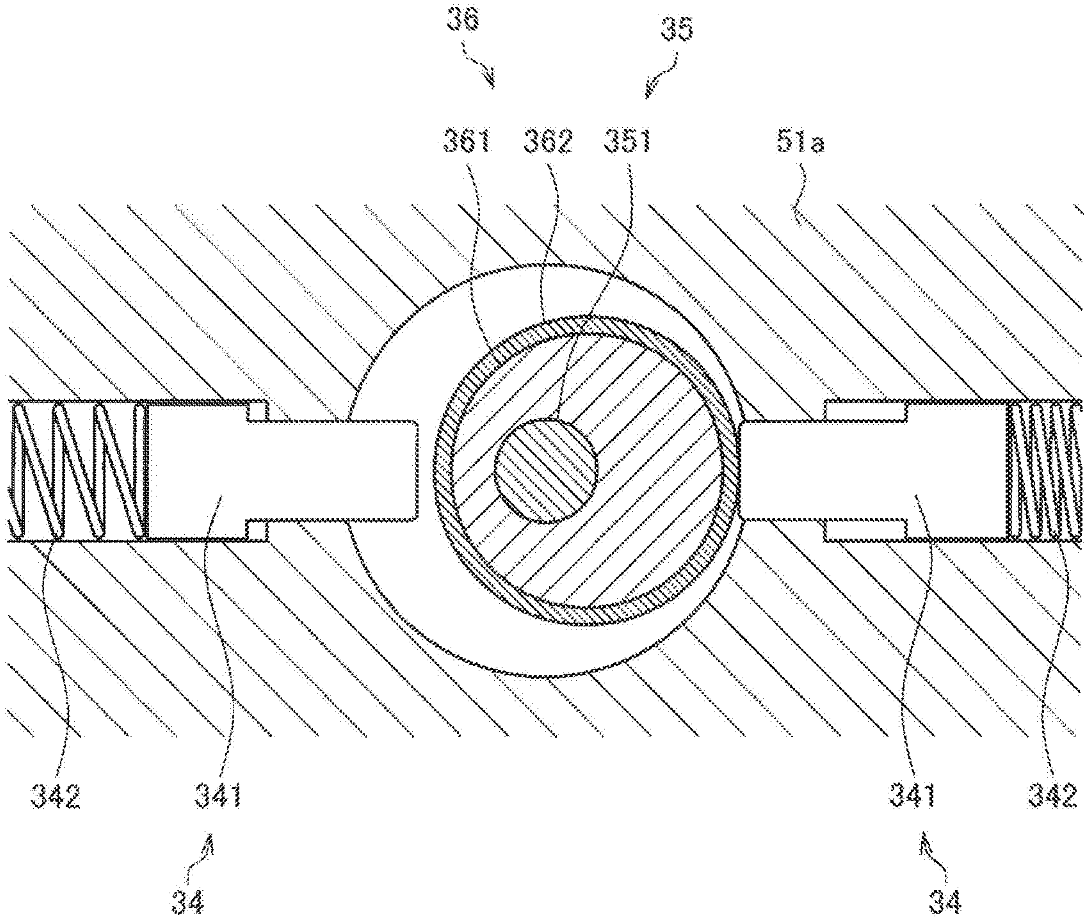

[FIG. 5]
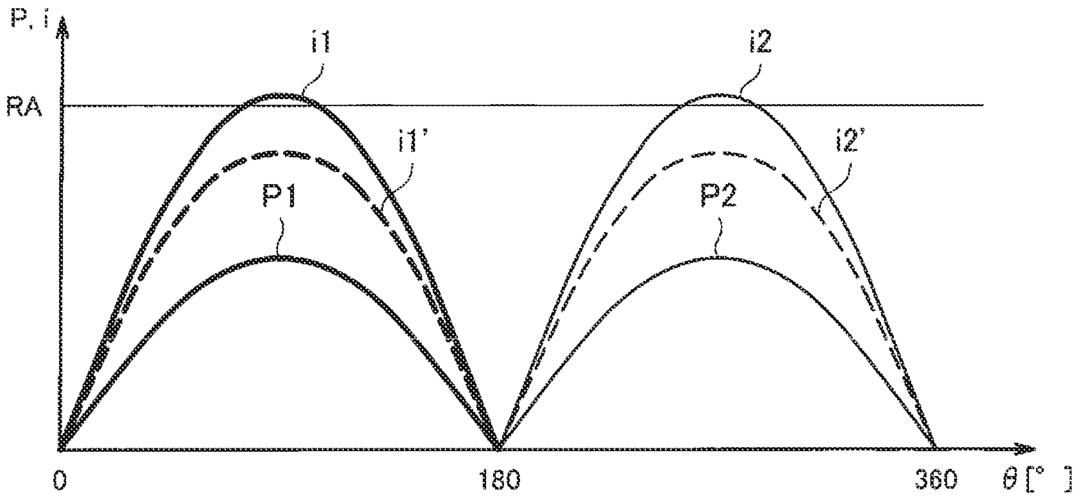

[FIG. 6]
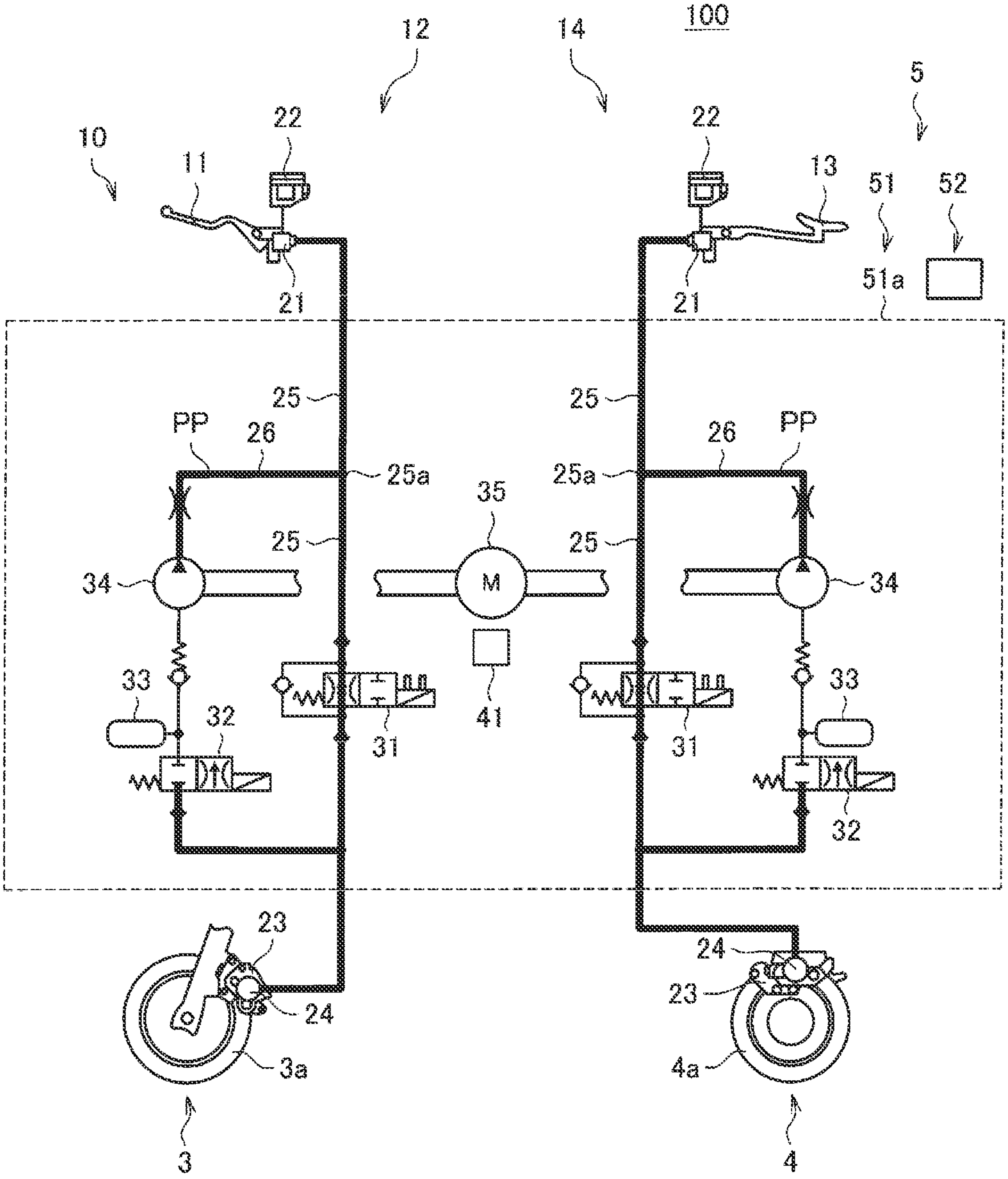

[FIG. 7]
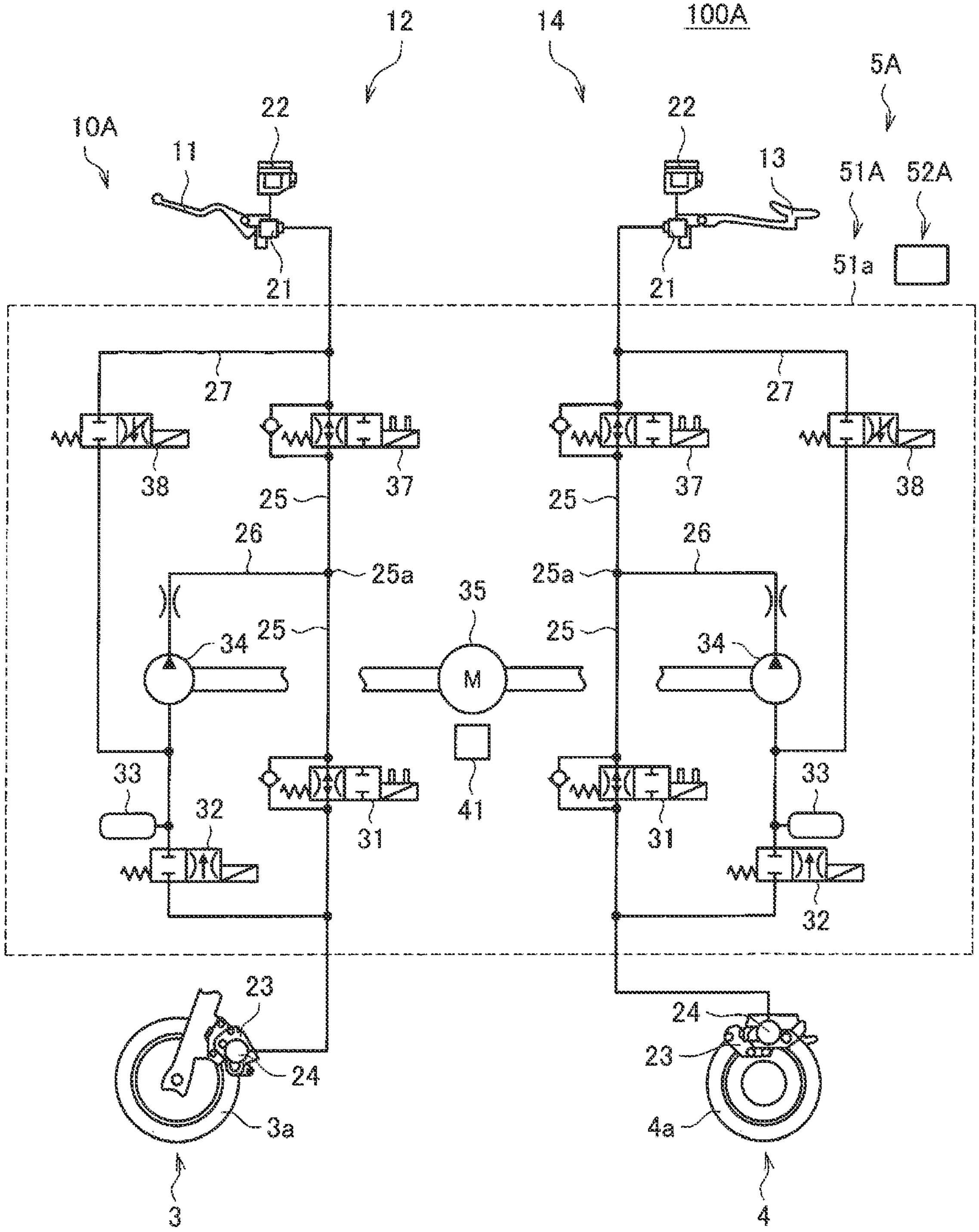

[FIG. 8]
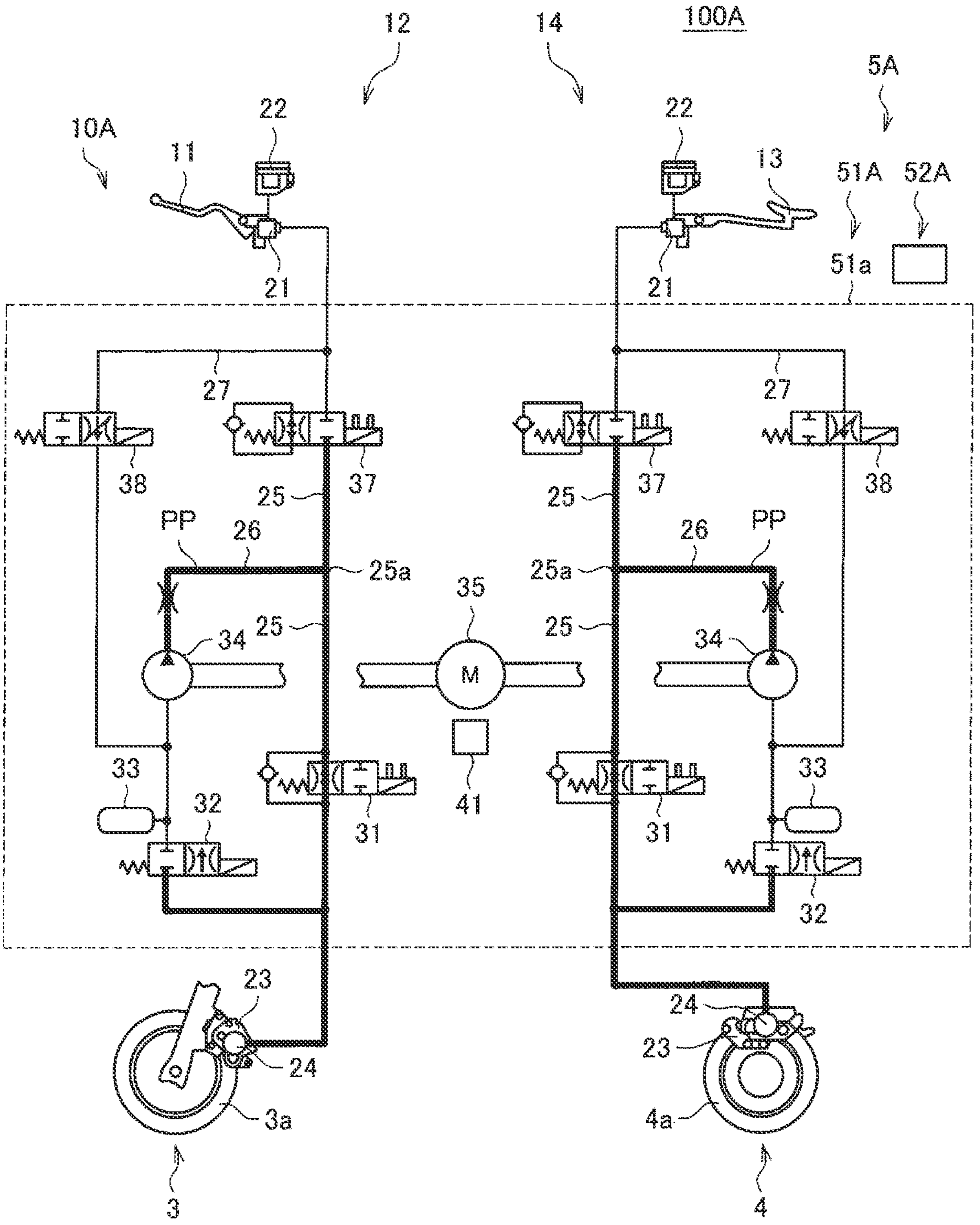

[FIG. 9]
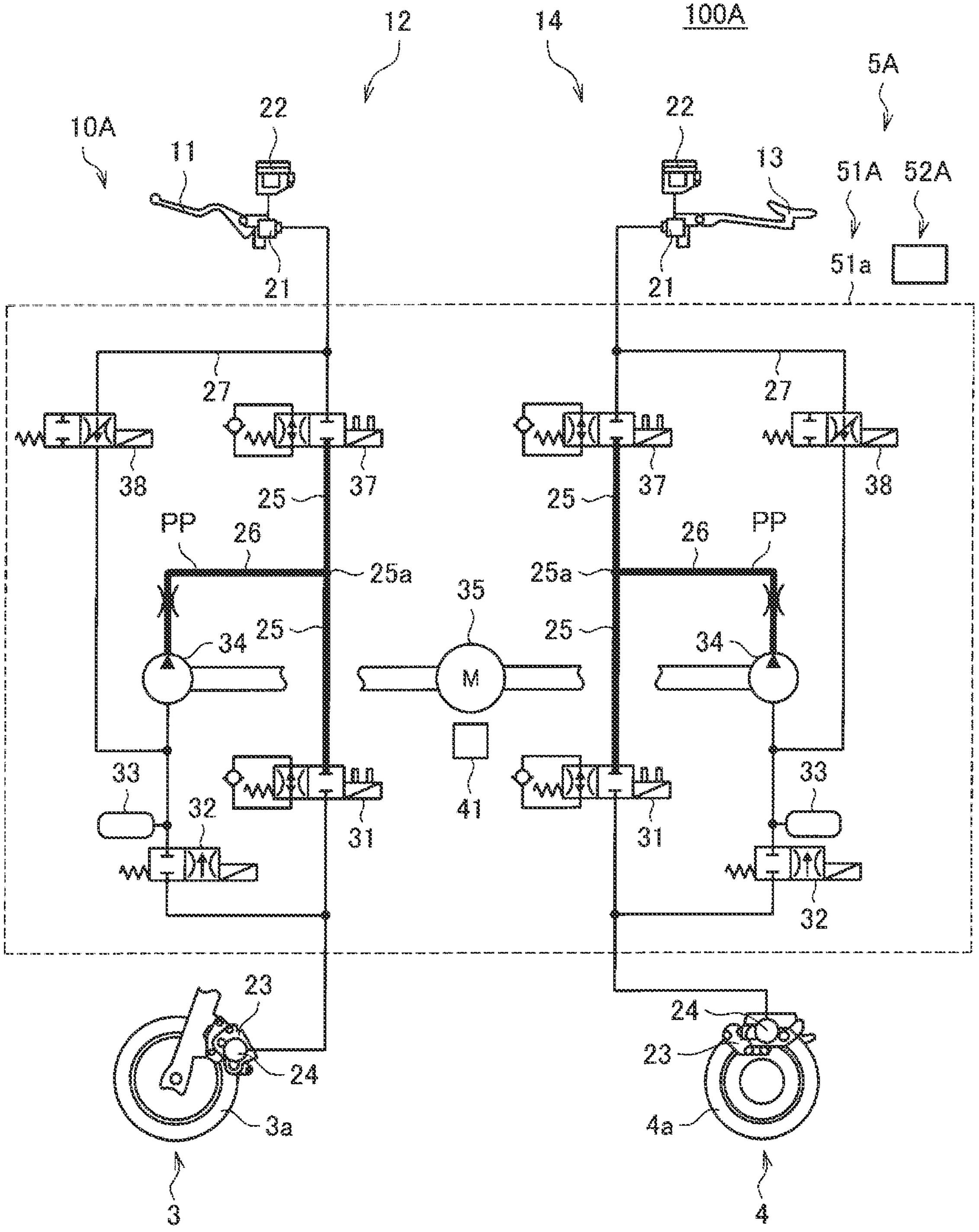

HYDRAULIC PRESSURE DIAGNOSTIC DETECTION FOR A VEHICLE

BACKGROUND

The present disclosure relates to a hydraulic pressure control unit capable of appropriately detecting abnormality in the hydraulic pressure control unit.

Conventionally, a vehicle such as a motorcycle is provided with a hydraulic pressure control unit for controlling a braking force on a wheel. As an example of such a hydraulic pressure control unit, the hydraulic pressure control unit includes a hydraulic pressure control mechanism, and the hydraulic pressure control mechanism includes: an inlet valve that is provided to a primary channel communicating a master cylinder and a wheel cylinder; an outlet valve that is provided to a secondary channel through which a hydraulic fluid in the wheel cylinder is released to an intermediate portion of the primary channel; a pump that is provided on a downstream side of the outlet valve in the secondary channel; and a motor that drives the pump (for example, see JP20188674A).

By the way, in the hydraulic pressure control unit, there is a case where the hydraulic pressure control mechanism is not operated as expected due to various factors such as contamination by a foreign substance. Thus, in order to improve safety, it is desired to propose a mechanism that appropriately detects abnormality in the hydraulic pressure control unit.

SUMMARY

The present invention has been made with the above-described problem as the background and therefore obtains a hydraulic pressure control unit capable of appropriately detecting abnormality in the hydraulic pressure control unit.

A hydraulic pressure control unit according to the present invention is a hydraulic pressure control unit used for a brake system of a vehicle, and includes: a hydraulic pressure control mechanism including an inlet valve that is provided to a primary channel communicating a master cylinder and a wheel cylinder, an outlet valve that is provided to a secondary channel through which a hydraulic fluid in the wheel cylinder is released to an intermediate portion of the primary channel, a pump that is provided on a downstream side of the outlet valve in the secondary channel, and a motor that drives the pump; and a controller that controls operation of the hydraulic pressure control mechanism. The controller includes a diagnosis section that executes a diagnostic mode to diagnose presence or absence of abnormality in the hydraulic pressure control mechanism on the basis of a current fluctuation of the motor in a state where the pump is driven by the motor.

In the hydraulic pressure control unit according to the present invention, the controller includes the diagnosis section that executes the diagnostic mode to diagnose the presence or the absence of the abnormality in the hydraulic pressure control mechanism on the basis of the current fluctuation of the motor in the state where the pump is driven by the motor. In this way, it is possible to appropriately diagnose the presence or the absence of the abnormality in the hydraulic pressure control mechanism according to a load acting on the motor. Therefore, it is possible to appropriately detect the abnormality in the hydraulic pressure control unit.

BRIEF DESCRIPTION OF DRAWINGS

FIG. 1 is a schematic view illustrating an outline configuration of a vehicle according to a first embodiment of the present invention.

FIG. 2 is a schematic view illustrating an outline configuration of a brake system according to the first embodiment of the present invention.

FIG. 3 is a block diagram illustrating an example of a functional configuration of a controller according to the first embodiment of the present invention.

FIG. 4 is a partial cross-sectional view illustrating a configuration around an output shaft of a motor according to the first embodiment of the present invention.

FIG. 5 is a schematic graph illustrating a relationship between a load acting on the motor and a rotational position of the motor according to the first embodiment of the present invention.

FIG. 6 is a schematic view illustrating a state of the brake system in a diagnostic mode according to the first embodiment of the present invention.

FIG. 7 is a schematic view illustrating an outline configuration of a brake system according to a second embodiment of the present invention.

FIG. 8 is a schematic view illustrating a state of the brake system in a diagnostic mode according to the second embodiment of the present invention.

FIG. 9 is a schematic view illustrating a different state from the state in FIG. 8 of the brake system in the diagnostic mode according to the second embodiment of the present invention.

DETAILED DESCRIPTION

A description will hereinafter be made on a hydraulic pressure control unit according to the present invention with reference to the drawings.

A description will hereinafter be made on the hydraulic pressure control unit used for a brake system of a two-wheeled motorcycle (see a vehicle 100 in FIG. 1). However, the hydraulic pressure control unit according to the present invention may be used for a brake system of a vehicle other than the two-wheeled motorcycle (for example, a straddle-type vehicle such as an all-terrain vehicle, a three-wheeled motorcycle, or a bicycle, a four-wheeled automobile, or the like). Here, the straddle-type vehicle means a vehicle that a rider straddles, and includes a scooter and the like.

A description will hereinafter be made on a case where one front-wheel brake mechanism and one rear-wheel brake mechanism are provided (see a front-wheel brake mechanism 12 and a rear-wheel brake mechanism 14 in FIG. 2). However, at least one of the front-wheel brake mechanism and the rear-wheel brake mechanism may be plural. Alternatively, one of the front-wheel brake mechanism and the rear-wheel brake mechanism may not be provided.

A configuration, operation, and the like, which will be described below, constitute merely one example, and the hydraulic pressure control unit according to the present invention is not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

First Embodiment

[Configuration]

A description will be made on a configuration of the vehicle 100 according to a first embodiment of the present invention with reference to FIG. 1 to FIG. 4.

FIG. 1 is a schematic view illustrating an outline configuration of the vehicle 100 according to the first embodiment of the present invention. FIG. 2 is a schematic view illustrating an outline configuration of a brake system 10 according to the first embodiment of the present invention.

The vehicle 100 is a two-wheeled motorcycle that corresponds to an example of the vehicle according to the present invention. As illustrated in FIG. 1, the vehicle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; a hydraulic pressure control unit 5; and a notification device 6. The hydraulic pressure control unit 5 is used for the brake system 10 of the vehicle 100. The notification device 6 notifies the rider. The notification device 6 has a sound output function and a display function. The sound output function is a function to output sound and is implemented by a speaker, for example. The display function is a function to show information visually, and is implemented by a liquid-crystal display, a lamp, or the like, for example. The vehicle 100 includes a drive source such as an engine or a motor, and travels by using power that is output from the drive source.

As illustrated in FIG. 1 and FIG. 2, the brake system 10 includes: a first brake operation section 11; the front-wheel brake mechanism 12 that brakes the front wheel 3 in an interlocking manner with at least the first brake operation section 11; a second brake operation section 13; and the rear-wheel brake mechanism 14 that brakes the rear wheel 4 in an interlocking manner with at least the second brake operation section 13. The brake system 10 also includes the hydraulic pressure control unit 5, and the front-wheel brake mechanism 12 and the rear-wheel brake mechanism 14 are partially included in the hydraulic pressure control unit 5. The hydraulic pressure control unit 5 is a unit that has a function to control a braking force to be applied to the front wheel 3 by the front-wheel brake mechanism 12 and a braking force to be applied to the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided to a lower portion of the trunk 1 and is operated by the rider's foot. The second brake operation section 13 is a brake pedal, for example. However, like a brake operation section of the scooter or the like, each of the first brake operation section 11 and the second brake operation section 13 may be the brake lever that is operated by the rider's hand.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 that communicates the master cylinder 21 and the wheel cylinder 24, and through which a brake fluid in the master cylinder 21 flows into the wheel cylinder 24; and a secondary channel 26 through which the brake fluid in the wheel cylinder 24 is released to an intermediate portion **25*a* of the primary channel 25**. The brake fluid corresponds to an example of the hydraulic fluid according to the present invention.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Just as described, the pump 34 is provided on a downstream side of the outlet valve 32 in the secondary channel 26. The inlet valve 31 is an electromagnetic valve that is opened in an unenergized state and is closed in an energized state, for example. The outlet valve 32 is an electromagnetic valve that is closed in an unenergized state and is opened in an energized state, for example.

The hydraulic pressure control unit 5 is provided with: a motor 35 that drives the pumps 34; and a current sensor 41 that detects a current value flowing through the motor 35. Here, the current sensor 41 may detect another physical quantity that can substantially be converted to the current value of the current flowing through the motor 35.

The hydraulic pressure control unit 5 includes: a hydraulic pressure control mechanism 51 that includes a part of the front-wheel brake mechanism 12 and a part of the rear-wheel brake mechanism 14 described above; and a controller (ECU) 52 that controls operation of the hydraulic pressure control mechanism 51.

The hydraulic pressure control mechanism 51 includes: a base body **51*a*; components (more specifically, the inlet valves 31, the outlet valves 32, the accumulators 33, and the pumps 34) that are assembled to the base body 51*a* and control a hydraulic pressure generated in the brake fluid as the hydraulic fluid in the brake system 10; and the motor 35. The component means an element such as a part that is assembled to the base body 51*a***.

The base body **51*a* has a substantially rectangular-parallelepiped shape and is formed of a metal material, for example. In the base body 51*a* of the hydraulic pressure control mechanism 51, the primary channels 25 and the secondary channels 26 are formed, and the inlet valves 31, the outlet valves 32, the accumulators 33, and the pumps 34 are assembled as the components. As will be described below, operation of each of these components and the motor 35 is controlled by the controller 52 of the hydraulic pressure control unit 5. The base body 51*a* may be formed of one member or may be formed of plural members. In the case where the base body 51*a*** is formed of the plural members, the components may separately be provided in the plural members.

For example, the controller 52 is partially or entirely constructed of a microcomputer, a microprocessor unit, or the like. In addition, the controller 52 may partially or entirely be constructed of one whose firmware and the like can be updated, or may partially or entirely be a program module or the like that is executed by a command from a CPU or the like, for example. The controller 52 may be provided as one unit or may be divided into plural units, for example. In addition, the controller 52 may be attached to the base body **51*a* or may be attached to a member other than the base body 51*a***.

FIG. 3 is a block diagram illustrating an example of a functional configuration of the controller 52 in the hydraulic pressure control unit 5. As illustrated in FIG. 3, the controller 52 includes an acquisition section 521 and a control section 522, for example.

The acquisition section 521 acquires information from each of the devices mounted to the vehicle 100, and outputs the acquired information to the control section 522. For example, the acquisition section 521 acquires information from the current sensor 41.

The control section 522 controls the operation of each of the various devices. The control section 522 includes a braking control section 522*a* and a diagnosis section 522*b*, for example.

The braking control section 522*a* controls the operation of each of the above-described components, which are assembled to the base body 51*a* of the hydraulic pressure control mechanism 51, and the operation of the motor 35. In this way, the braking control section 522*a* can control the braking force to be applied to the front wheel 3 by the front-wheel brake mechanism 12 and the braking force to be applied to the rear wheel 4 by the rear-wheel brake mechanism 14.

The diagnosis section 522*b* executes a diagnostic mode to diagnose presence or absence of abnormality in the hydraulic pressure control mechanism 51 by appropriately controlling the operation of the hydraulic pressure control mechanism 51. A detailed description will be made below on the diagnostic mode executed by the diagnosis section 522*b*. As will be described below, the diagnosis section 522*b* can also control the operation of the notification device 6.

As described above, in the hydraulic pressure control unit 5, the braking force to be applied to the wheel is controlled by controlling the operation of the hydraulic pressure control mechanism 51.

In a normal time (that is, when anti-lock brake control, which will be described below, is not executed), the braking control section 522*a* opens the inlet valve 31 and closes the outlet valve 32. When the first brake operation section 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor 3*a* of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4*a* of the rear wheel 4, and the braking force is thereby generated on the rear wheel 4.

The anti-lock brake control is control that is executed when the wheel (more specifically, the front wheel 3 or the rear wheel 4) is locked or possibly locked and that reduces the braking force to be applied to the wheel without relying on a brake operation by the rider, for example. In the anti-lock brake control, pressure reduction control, hydraulic pressure keeping control, and pressure increase control are continuously executed in this order. The pressure reduction control reduces a brake hydraulic pressure of the wheel, the hydraulic pressure keeping control keeps the brake hydraulic pressure of the wheel, and the pressure increase control increases the brake hydraulic pressure of the wheel. The pressure reduction control, the hydraulic pressure keeping control, and the pressure increase control are repeated, for example, until it is determined that locking of the wheel is avoided.

In the pressure reduction control, the brake control section 522*a* brings a state where the inlet valve 31 is closed and the outlet valve 32 is opened, and drives the pump 34 by the motor 35 in such a state. In this way, the brake control section 522*a* reduces the hydraulic pressure of the brake fluid in the wheel cylinder 24. In this way, the braking force generated on the wheel is reduced. In the pressure reduction control, the brake fluid that has flowed into the accumulator 33 from the wheel cylinder 24 is returned to the primary channel 25 via the secondary channel 26 by the pump 34. Next, in the hydraulic pressure keeping control, the brake control section 522*a* closes both of the inlet valve 31 and the outlet valve 32, and thereby keeps the hydraulic pressure of the brake fluid in the wheel cylinder 24. In this way, the braking force generated on the wheel is kept. Next, in the pressure increase control, the brake control section 522*a* opens the inlet valve 31, closes the outlet valve 32, and thereby increases the hydraulic pressure of the brake fluid in the wheel cylinder 24. In this way, the braking force generated on the wheel is increased.

As described above, the motor 35 and the pump 34 are driven in the pressure reduction control of the anti-lock brake control. A description will hereinafter be made on a configuration of a connection portion between the motor 35 and the pump 34 with reference to FIG. 4.

FIG. 4 is a partial cross-sectional view illustrating a configuration around an output shaft 351 of the motor 35. FIG. 4 illustrates portions on the output shaft 351 side of the two pumps 34. The two pumps 34 in FIG. 4 are the pump 34 in the front-wheel brake mechanism 12 and the pump 34 in the rear-wheel brake mechanism 14. As illustrated in FIG. 4, a plunger 341 of each of the pumps 34 is arranged near the output shaft 351 of the motor 35. The plunger 341 has a substantially columnar shape and reciprocates in an axial direction (a right-left direction in FIG. 4) of the plunger 341. The reciprocating motion of the plunger 341 causes suction and discharge of the brake fluid by the pump 34. The plungers 341 oppose each other. For example, the axial directions of the plungers 341 substantially match each other (that is, the plungers 341 are arranged substantially in parallel), and the plungers 341 are arranged apart from each other in the axial direction.

The output shaft 351 of the motor 35 is provided with an eccentric cam section 36 that is eccentric to the output shaft 351. The eccentric cam section 36 includes: a columnar cam member 361 that is eccentric to the output shaft 351 of the motor 35; and a rolling bearing 362 that is fitted to an outer circumferential portion of the cam member 361. The eccentric cam section 36 is arranged between the plungers 341, and an axial direction of the eccentric cam section 36 is orthogonal to the axial direction of each of the plungers 341. Just as described, the plungers 341 oppose each other with the eccentric cam section 36 being interposed therebetween. A spring 342 abuts a base end portion (that is, an end portion on an opposite side of the output shaft 351 side) of each of the plungers 341, and each of the plungers 341 is urged by the spring 342 in a direction to approach the output shaft 351. A tip portion (that is, an end portion on the output shaft 351 side) of each of the plungers 341 is in contact with an outer circumferential surface of the rolling bearing 362 in the eccentric cam section 36.

When the output shaft 351 of the motor 35 rotates, the eccentric cam section 36 rotates eccentrically to the output shaft 351 and keeps pressing one of the plungers 341 and the other plunger 341 alternately. That is, each of the plungers 341 is pressed intermittently by the eccentric cam section 36.

At this time, the eccentric cam section 36 presses the plunger 341 against an urging force of the spring 342.

A type of the motor 35 is not particularly limited. For example, the motor 35 may be a DC motor or an AC motor. For example, the motor 35 may be a brushed DC motor or a brushless DC motor. A configuration of the pump 34 is not particularly limited, and, for example, various components such as a check valve may be provided to the plunger 341.

Here, in the hydraulic pressure control unit 5, there is a case where the hydraulic pressure control mechanism 51 is not operated as expected due to various factors such as contamination by a foreign substance. For example, there is a case where the pump 34 is fixed (that is, stuck) due to such a factor that the foreign substance enters a clearance between the plunger 341 of the pump 34 and the base body 51*a*. The fixation of the pump 34 is a state where, regardless of whether being pressed by the eccentric cam section 36, the plunger 341 keeps being held at the position of being pressed by the eccentric cam section 36 and thus the plunger 341 is no longer operated. Once the pump 34 is fixed, the hydraulic pressure control mechanism 51 is no longer operated as expected, and it becomes difficult to control the braking force to be applied to the wheel as expected.

In this embodiment, the abnormality in the hydraulic pressure control unit 5 is appropriately detected by devising processing related to the diagnostic mode in which the diagnosis section 522*b* of the controller 52 diagnoses the presence or the absence of the abnormality in the hydraulic pressure control mechanism 51

[Operation]

A description will be made on the operation of the hydraulic pressure control unit 5 according to the first embodiment of the present invention with reference to FIG. 5 and FIG. 6.

As described above, the diagnosis section 522*b* of the controller 52 executes the diagnostic mode to diagnose the presence or the absence of the abnormality in the hydraulic pressure control mechanism 51. For example, the diagnostic mode may repeatedly be executed at specified time intervals, or may be executed once when a power supply system of the vehicle 100 is turned on. In addition, the diagnostic mode may be executed while the vehicle 100 is stopped or during travel of the vehicle 100.

In the diagnostic mode by the diagnosis section 522*b*, the presence or the absence of the abnormality in the hydraulic pressure control mechanism 51 is diagnosed by focusing on a relationship between the current value of the current flowing through the motor 35 and a load (that is, a pressure) acting on the motor 35. A description will hereinafter be made on the relationship between the current value of the current flowing through the motor 35 and the load acting on the motor 35 with reference to FIG. 5.

When pressing the pump 34, the motor 35 is applied with the load as rotation resistance. FIG. 5 is a schematic graph illustrating the relationship between the load acting on the motor 35 and a rotational position of the motor 35. A horizontal axis in FIG. 5 represents a rotation angle θ of the motor 35. A vertical axis in FIG. 5 represents a pressure P applied to the motor 35 and a current value i of the current flowing through the motor 35. FIG. 5 illustrates: a pressure P1 that is applied to the motor 35 at the time when the motor 35 presses the plunger 341 of one of the pumps 34; and a pressure P2 that is applied to the motor 35 at the time when the motor 35 presses the plunger 341 of the other pump 34.

In the example illustrated in FIG. 5, in the case where the rotation angle θ of the motor 35 is 0° to 180°, the one plunger 341 is pressed by the eccentric cam section 36, and the pressure P1 is generated. The pressure P1 is increased as the rotation angle θ moves from 0° toward 90°, becomes the largest at the rotation angle θ near 90°, and is then reduced as the rotation angle θ moves from the angle near 90° toward 180°. In the case where the rotation angle θ of the motor 35 is 180° to 360°, the other plunger 341 is pressed by the eccentric cam section 36, and the pressure P2 is generated. The pressure P2 is increased as the rotation angle θ moves from 180° toward 270°, becomes the largest at the rotation angle θ near 270°, and is then reduced as the rotation angle θ moves from the angle near 270° toward 360°.

In FIG. 5, a current value i1 and a current value i2 are each indicated by a solid line. The current value i1 is the current value of the current flowing through the motor 35 while the pressure P1 is generated. The current value i2 is the current value of the current flowing through the motor 35 while the pressure P2 is generated. The current value i1 is increased as the rotation angle θ moves from 0° toward 90°, becomes the highest at the rotation angle θ near 90°, and is then reduced as the rotation angle θ moves from the angle near 90° toward 180°. The current value i2 is increased as the rotation angle θ moves from 180° toward 270°, becomes the highest at the rotation angle θ near 270°, and is then reduced as the rotation angle θ moves from the angle near 270° toward 360°. Just as described, the current value i of the current flowing through the motor 35 is correlated with the pressure P applied to the motor 35. Thus, the diagnosis section 522*b* can estimate the load (that is, the pressure) acting on the motor 35 on the basis of a current fluctuation of the motor 35 (that is, a fluctuation in the current value i of the current flowing through the motor 35).

In this embodiment, in the diagnostic mode, the diagnosis section 522*b* diagnoses the presence or the absence of the abnormality in the hydraulic pressure control mechanism 51 on the basis of the current fluctuation of the motor 35 in a state where the pump 34 is driven by the motor 35. In this way, it is possible to appropriately diagnose the presence or the absence of the abnormality in the hydraulic pressure control mechanism 51 according to the load acting on the motor 35.

For example, in the case where the pump 34 is operated normally, a channel on the discharge side of the pump 34 is pressurized, and the load acting on the motor 35 is thereby increased. Accordingly, the current value i of the current flowing through the motor 35 is also increased. On the other hand, in the case where the pump 34 is fixed, the channel on the discharge side of the pump 34 is not pressurized. Furthermore, since the plunger 341 of the pump 34 is no longer operated, the urging force of the spring 342 of the pump 34 no longer acts on the motor 35. As a result, the load acting on the motor 35 becomes smaller than that in the case where the pump 34 is operated normally. Accordingly, the current value i of the current flowing through the motor 35 also becomes lower than that in the case where the pump 34 is operated normally. Thus, it is possible to detect the abnormality (for example, the fixation of the pump 34) in the hydraulic pressure control mechanism 51 on the basis of the current fluctuation of the motor 35. As described above, according to this embodiment, it is possible to appropriately detect the abnormality in the hydraulic pressure control unit 5.

For example, in the diagnostic mode, in the case where an amplitude (that is, a peak value of the current value i) of the current fluctuation of the motor 35 is smaller than a reference amplitude RA, the diagnosis section 522*b* diagnoses that the hydraulic pressure control mechanism 51 is abnormal. The reference amplitude RA is set to a value with which it is possible to determine whether the load acting on the motor 35 is small enough to diagnose that the abnormality occurs to the hydraulic pressure control mechanism 51. Amplitudes of the current values i1, i2, which are indicated by the solid lines in FIG. 5, are larger than the reference amplitude RA. Thus, in the case where the current value i of the current flowing through the motor 35 is the current values i1, i2 in FIG. 5, the diagnosis section 522*b* diagnoses that the hydraulic pressure control mechanism 51 is normal. Meanwhile, amplitudes of current values i1', i2', which are indicated by broken lines in FIG. 5, are smaller than the reference amplitude RA. Thus, in the case where the current value i of the current flowing through the motor 35 is the current values i1', i2' in FIG. 5, the diagnosis section 522*b* diagnoses that the hydraulic pressure control mechanism 51 is abnormal.

Here, such a case is also assumed that the abnormality such as the fixation of the pump 34 only occurs to one of the front-wheel brake mechanism 12 and the rear-wheel brake mechanism 14. For example, in the case where the current value i is the current value i1' in FIG. 5 at the rotation angle θ of 0° to 180° and the current value i is the current value i2 in FIG. 5 at the rotation angle θ of 180° to 360°, the diagnosis section 522*b* diagnoses that only the front-wheel brake mechanism 12 among the front-wheel brake mechanism 12 and the rear-wheel brake mechanism 14 is abnormal. Just as described, the diagnosis section 522*b* can independently diagnose the presence or the absence of the abnormality for each of the front-wheel brake mechanism 12 and the rear-wheel brake mechanism 14, for example, on the basis of a corresponding relationship between the rotation angle θ and the current value i. Here, the information on the rotation angle θ can be obtained by the acquisition section 521 using a sensor that detects the rotation angle θ.

As described above, in the diagnostic mode, the diagnosis section 522*b* diagnoses presence or absence of the fixation of the pump 34 as the presence or the absence of the abnormality in the hydraulic pressure control mechanism 51, for example. Here, it is assumed that the channel on the discharge side of the pump 34 is not pressurized also in the case where the abnormality (for example, fixation) occurs to the electromagnetic valve of the hydraulic pressure control mechanism 51. In this case, the load acting on the motor 35 and the current value i of the current flowing through the motor 35 become smaller than those in the case where the electromagnetic valve is operated normally. Thus, in this case, the diagnosis section 522*b* diagnoses that the hydraulic pressure control mechanism 51 is abnormal. Just as described, in the diagnostic mode, the diagnosis section 522*b* can also diagnose presence or absence of the abnormality of the electromagnetic valve as the presence or the absence of the abnormality in the hydraulic pressure control mechanism 51.

For example, in the case where it is understood that the amplitude of the current fluctuation of the motor 35 is smaller than the reference amplitude RA and the electromagnetic valve is normal, the diagnosis section 522*b* diagnoses that the pump 34 is fixed. Alternatively, for example, in the case where it is understood that the amplitude of the current fluctuation of the motor 35 is smaller than the reference amplitude RA and the pump 34 is normal, the diagnosis section 522*b* diagnoses that the electromagnetic valve is fixed.

FIG. 6 is a schematic view illustrating a state of the brake system 10 in the diagnostic mode. As illustrated in FIG. 6, in the diagnostic mode, the diagnosis section 522*b* drives the pump 34 by the motor 35 in a state where the outlet valve 32 is closed. In the example illustrated in FIG. 6, in the diagnostic mode, the diagnosis section 522*b* controls each of the electromagnetic valves in a manner to bring the inlet valve 31 into an open state and the outlet valve 32 into the closed state. As will be described below, in the diagnostic mode, the diagnosis section 522*b* may bring the inlet valve 31 into the closed state.

In the case where the hydraulic pressure control mechanism 51 is normal (that is, in the case where the abnormality such as the fixation of the pump 34 does not occur), in the diagnostic mode, the pump 34 is driven, and the channel on the discharge side of the pump 34 is thereby pressurized. In FIG. 6, a pressurized portion PP that is pressurized and in which the hydraulic pressure is increased in the diagnostic mode is indicated by a bold line. In the example illustrated in FIG. 6, the pressurized portion PP includes: an entire area of the primary channel 25 (that is, a portion between the master cylinder 21 and the wheel cylinder 24); a portion on the downstream side of the pump 34 in the secondary channel 26; and a portion on the upstream side of the outlet valve 32 in the secondary channel 26. In the case where the hydraulic pressure control mechanism 51 is normal, the pressurized portion PP is pressurized, and the load acting on the motor 35 is increased. As a result, the current value i of the current flowing through the motor 35 is increased.

On the other hand, in the case where the hydraulic pressure control mechanism 51 is abnormal (for example, in the case where the pump 34 is fixed), the pressurized portion PP is not pressurized, and the load acting on the motor 35 becomes smaller than that in the case where the hydraulic pressure control mechanism 51 is normal. In particular, in the case where the pump 34 is fixed, the urging force of the spring 342 of the pump 34 no longer acts on the motor 35. Thus, the load acting on the motor 35 is further reduced. Accordingly, the current value i of the current flowing through the motor 35 also becomes lower than that in the case where the hydraulic pressure control mechanism 51 is normal. Thus, it is possible to detect the abnormality (for example, the fixation of the pump 34) in the hydraulic pressure control mechanism 51 on the basis of the current fluctuation of the motor 35.

As described above, in the case where the pump 34 is fixed, the current value i of the current flowing through the motor 35 is reduced due to the factor that the urging force of the spring 342 of the pump 34 no longer acts on the motor 35. Here, by setting the urging force of the spring 342 to a force that is as large as possible, it is possible to further increase the amplitude of the current fluctuation of the motor 35 in the case where the pump 34 is not fixed. In this way, it is possible to increase a difference in the amplitude of the current fluctuation of the motor 35 between the case where the pump 34 is not fixed and the case where the pump 34 is fixed. Thus, it is possible to further appropriately diagnose the presence or the absence of the fixation of the pump 34.

Here, the diagnosis section 522*b* may control notification operation on the basis of the diagnosis result in the diagnostic mode. The notification operation is operation to notify the rider of various types of information. For example, the notification operation is performed by the notification device 6 and may be operation to show the information or operation to output sound. Here, the notification operation may be terminated after being continued for a set period, or may be terminated when the rider performs an input operation to stop the notification operation.

For example, in the case where the diagnosis section 522*b* diagnoses that the hydraulic pressure control mechanism 51 is abnormal, the diagnosis section 522*b* causes the notification device 6 to perform the notification operation so as to notify that the hydraulic pressure control mechanism 51 is abnormal. On the other hand, in the case where the diagnosis section 522*b* diagnoses that the hydraulic pressure control mechanism 51 is normal, the diagnosis section 522*b* stops the notification operation by the notification device 6. However, in the case where the diagnosis section 522*b* diagnoses that the hydraulic pressure control mechanism 51 is normal, the diagnosis section 522*b* may cause the notification device 6 to perform the notification operation so as to notify that the hydraulic pressure control mechanism 51 is normal.

The notification operation may be performed by a device other than the notification device 6. For example, the notification operation may be performed by a display device (for example, a transmissive display arranged over the rider's line of sight) that is provided to a helmet worn on the rider's head. Alternatively, for example, the notification operation may be performed by a sound output device that is provided to the helmet worn on the rider's head. Further alternatively, for example, the notification operation may be operation to generate vibration by a vibration generator that is provided to the vehicle 100 or is attached to the rider. For example, the notification operation may be operation to instantaneously decelerate the vehicle 100. The above instantaneous deceleration may occur by reducing output of the drive source, may occur by generating the braking force by the hydraulic pressure control unit 5, or may occur by changing a gear ratio of a transmission mechanism of the vehicle 100.

[Effects]

A description will be made on effects of the hydraulic pressure control unit 5 according to the first embodiment of the present invention.

In the hydraulic pressure control unit 5, the diagnosis section 522*b* executes the diagnostic mode in which the diagnosis section 522*b* diagnoses the presence or the absence of the abnormality in the hydraulic pressure control mechanism 51 on the basis of the current fluctuation of the motor 35 in the state where the pump 34 is driven by the motor 35. In this way, it is possible to appropriately diagnose the presence or the absence of the abnormality in the hydraulic pressure control mechanism 51 according to the load acting on the motor 35. Therefore, it is possible to appropriately detect the abnormality in the hydraulic pressure control unit 5.

Preferably, in the hydraulic pressure control unit 5, in the diagnostic mode, the diagnosis section 522*b* diagnoses the presence or the absence of the fixation of the pump 34 as the presence or the absence of the abnormality in the hydraulic pressure control mechanism 51. In this way, it is possible to appropriately diagnose the presence or the absence of the fixation of the pump 34 according to the load acting on the motor 35. Therefore, it is possible to appropriately detect the fixation of the pump 34.

Preferably, in the hydraulic pressure control unit 5, in the diagnostic mode, in the case where the amplitude of the current fluctuation of the motor 35 is smaller than the reference amplitude RA, the diagnosis section 522*b* diagnoses that the hydraulic pressure control mechanism 51 is abnormal. In this way, it is possible to appropriately diagnose the presence or the absence of the abnormality in the hydraulic pressure control mechanism 51 by focusing on the relationship between the current value i of the current flowing through the motor 35 and the load acting on the motor 35. Therefore, it is possible to appropriately detect the abnormality in the hydraulic pressure control unit 5.

Preferably, in the hydraulic pressure control unit 5, in the diagnostic mode, the diagnosis section 522*b* drives the pump 34 by the motor 35 in the state where the outlet valve 32 is closed. In this way, in the diagnostic mode, the channel on the discharge side of the pump 34 is pressurized when the hydraulic pressure control mechanism 51 is normal, and the channel on the discharge side of the pump 34 is not pressurized when the hydraulic pressure control mechanism 51 is abnormal. Accordingly, it is possible to change the magnitude of the load acting on the motor 35 between the case where the hydraulic pressure control mechanism 51 is normal and the case where the hydraulic pressure control mechanism 51 is abnormal. Therefore, it is possible to appropriately diagnose the presence or the absence of the abnormality in the hydraulic pressure control mechanism 51 according to the load acting on the motor 35.

Preferably, in the hydraulic pressure control unit 5, the diagnosis section 522*b* controls the notification operation on the basis of the diagnosis result in the diagnostic mode. In this way, it is possible to notify the rider of the information on the diagnosis result of the presence or the absence of the abnormality in the hydraulic pressure control mechanism 51. Thus, the rider can comprehend whether the hydraulic pressure control mechanism 51 is abnormal. Therefore, safety is improved.

Second Embodiment

[Configuration]

A description will be made on a configuration of a vehicle 100A according to a second embodiment of the present invention with reference to FIG. 7.

FIG. 7 is a schematic view illustrating an outline configuration of a brake system 10A according to the second embodiment of the present invention. The vehicle 100A according to the second embodiment differs from the vehicle 100 according to the above-described first embodiment in a point that the brake system 10A is provided instead of the brake system 10. In the brake system 10A, the front-wheel brake mechanism 12 and the rear-wheel brake mechanism 14 are partially included in a hydraulic pressure control unit 5A.

As illustrated in FIG. 7, the brake system 10A differs from the above-described brake system 10 (see FIG. 2) in a point that each of the front-wheel brake mechanism 12 and the rear-wheel brake mechanism 14 further includes a supply channel 27 through which the brake fluid in the master cylinder 21 is supplied to a portion between the outlet valve 32 and the pump 34 in the secondary channel 26. The supply channel 27 communicates between the master cylinder 21 and a portion on the suction side of the pump 34 in the secondary channel 26.

In addition, the brake system 10A differs from the above-described brake system 10 in a point that each of the front-wheel brake mechanism 12 and the rear-wheel brake mechanism 14 is provided with a first valve (USV) 37 and a second valve (HSV) 38. The first valve 37 is provided on the master cylinder 21 side of the intermediate portion 25*a* in the primary channel 25. The supply channel 27 is connected to a portion on the master cylinder 21 side of the first valve 37 in the primary channel 25. The second valve 38 is provided to the supply channel 27. The first valve 37 is an electromagnetic valve that is opened in an unenergized state and is closed in an energized state, for example. The second valve 38 is an electromagnetic valve that is closed in an unenergized state and is opened in an energized state, for example.

The hydraulic pressure control unit 5A includes: a hydraulic pressure control mechanism 51A; and a controller (ECU) 52A that controls operation of the hydraulic pressure control mechanism 51A.

The hydraulic pressure control mechanism 51A differs from the above-described hydraulic pressure control mechanism 51 in points that the supply channel 27 is further formed in the base body 51*a* and that the first valve 37 and the second valve 38 are further assembled as the components of the base body 51*a*.

A functional configuration of the controller 52A is the same as the functional configuration of the above-described controller 52. However, the braking control section 522*a* of the controller 52A can also execute control other than the above-described anti-lock brake control by further controlling operation of the first valve 37 and the second valve 38. For example, the braking control section 522*a* can execute automated brake control.

The automated brake control is control that is executed when it is necessary to stabilize a posture of the vehicle 100A during turning or the like of the vehicle 100A and that causes generation of the braking force to be applied to the wheel (more specifically, the front wheel 3 or the rear wheel 4) without relying on the brake operation by the rider, for example. For example, in the automated brake control, the braking control section 522*a* brings a state where the inlet valve 31 is opened, the outlet valve 32 is closed, the first valve 37 is closed, and the second valve 38 is opened. Then, the braking control section 522*a* drives the pump 34 by the motor 35 in such a state to increase the hydraulic pressure of the brake fluid in the wheel cylinder 24. In this way, the braking force that brakes the wheel is generated.

[Operation]

A description will be made on operation of the hydraulic pressure control unit 5A according to the second embodiment of the present invention with reference to FIG. 8 and FIG. 9.

Similar to the above-described first embodiment, in the diagnostic mode, the diagnosis section 522*b* of the controller 52A diagnoses presence or absence of abnormality in the hydraulic pressure control mechanism 51A on the basis of the current fluctuation of the motor 35 in the state where the pump 34 is driven by the motor 35. In addition, similar to the above-described first embodiment, in the diagnostic mode, the diagnosis section 522*b* diagnoses the presence or the absence of the fixation of the pump 34 as the presence or the absence of the abnormality in the hydraulic pressure control mechanism 51A, for example. Furthermore, similar to the above-described first embodiment, in the diagnostic mode, for example, in the case where the amplitude of the current fluctuation of the motor 35 is smaller than the reference amplitude RA, the diagnosis section 522*b* diagnoses that the hydraulic pressure control mechanism 51A is abnormal.

FIG. 8 is a schematic view illustrating a state of the brake system 10A in the diagnostic mode. As illustrated in FIG. 8, in this embodiment, in the diagnostic mode, the diagnosis section 522*b* drives the pump 34 by the motor 35 in a state where the first valve 37 is closed and the second valve 38 is opened. In the example illustrated in FIG. 8, in the diagnostic mode, the diagnosis section 522*b* controls each of the electromagnetic valves in a manner to bring the inlet valve 31 into the open state, the outlet valve 32 into the closed state, the first valve 37 into the closed state, and the second valve 38 into the open state.

In the example illustrated in FIG. 8, in the diagnostic mode, the pressurized portion PP, which is pressurized when the hydraulic pressure control mechanism 51A is normal and in which the hydraulic pressure is thereby increased, includes: a portion of the primary channel 25 between the first valve 37 and the wheel cylinder 24; the portion on the downstream side of the pump 34 in the secondary channel 26; and the portion on the upstream side of the outlet valve 32 in the secondary channel 26. In the case where the hydraulic pressure control mechanism 51A is normal, the pressurized portion PP is pressurized, and the load acting on the motor 35 is increased. As a result, the current value i of the current flowing through the motor 35 is increased.

On the other hand, in the case where the hydraulic pressure control mechanism 51A is abnormal (for example, in the case where the pump 34 is fixed), the pressurized portion PP is not pressurized, and the load acting on the motor 35 becomes smaller than that in the case where the hydraulic pressure control mechanism 51A is normal. Accordingly, the current value i of the current flowing through the motor 35 also becomes lower than that in the case where the hydraulic pressure control mechanism 51A is normal. Thus, it is possible to detect the abnormality (for example, the fixation of the pump 34) in the hydraulic pressure control mechanism 51A on the basis of the current fluctuation of the motor 35.

FIG. 9 is a schematic view illustrating a different state from the state in FIG. 8 of the brake system 10A in the diagnostic mode. The opened/closed state of each of the electromagnetic valves in the example illustrated in FIG. 9 differs from the opened/closed state of each of the electromagnetic valves in the example illustrated in FIG. 8 in a point that the inlet valve 31 is in the closed state. Just as described, in the diagnostic mode, the diagnosis section 522*b* may drive the pump 34 by the motor 35 in the state where the inlet valve 31 is closed. In the example illustrated in FIG. 9, in the diagnostic mode, the pressurized portion PP, which is pressurized when the hydraulic pressure control mechanism 51A is normal and in which the hydraulic pressure is thereby increased, includes: a portion of the primary channel 25 between the first valve 37 and the inlet valve 31; and the portion on the downstream side of the pump 34 in the secondary channel 26. Just as described, in the example illustrated in FIG. 9, unlike the example illustrated in FIG. 8, the portion of the primary channel 25 between the inlet valve 31 and the wheel cylinder 24 is not included in the pressurized portion PP.

Also, in the example illustrated in FIG. 9, similar to the example illustrated in FIG. 8, in the case where the hydraulic pressure control mechanism 51A is normal, the pressurized portion PP is pressurized, and the current value i of the current flowing through the motor 35 is increased. On the other hand, in the case where the hydraulic pressure control mechanism 51A is abnormal, the pressurized portion PP is not pressurized, and the current value i of the current flowing through the motor 35 becomes lower than that in the case where the hydraulic pressure control mechanism 51A is normal. Thus, it is possible to detect the abnormality (for example, the fixation of the pump 34) in the hydraulic pressure control mechanism 51A on the basis of the current fluctuation of the motor 35.

Here, in the example illustrated in FIG. 9, in the diagnostic mode, the inlet valve 31 is brought into the closed state. Accordingly, even when the hydraulic pressure control mechanism 51A is normal, the brake fluid in the wheel cylinder 24 is not pressurized. In this way, it is possible to suppress braking of the vehicle 100A that contradicts the rider's intention. In particular, during the execution of the diagnostic mode that is executed during travel of the vehicle 100A, the diagnosis section 522*b* preferably brings the inlet valve 31 into the closed state. Also, in the hydraulic pressure control mechanism 51 according to the above-described first embodiment, in the diagnostic mode, the diagnosis section 522*b* may bring the inlet valve 31 into the closed state from a perspective of suppressing braking of the vehicle 100 that contradicts the rider's intention.

In the case where the inlet valve 31 is in the closed state during the execution of the diagnostic mode, which is executed during the travel of the vehicle 100A, the diagnosis section 522*b* preferably brings the inlet valve 31 into the open state from the closed state under a specified situation.

For example, in the case where the brake operation is performed by a rider of the vehicle 100A during the execution of the diagnostic mode, which is executed during the travel of the vehicle 100A, the diagnosis section 522*b* brings the inlet valve 31 into the open state from the closed state. For example, the diagnosis section 522*b* can determine whether the brake operation is performed by the rider on the basis of a detection result of a master-cylinder pressure sensor that is provided to the vehicle 100A. In the case where the brake operation is performed by the rider, the rider intends to brake the vehicle 100A. In such a case, it is possible to pressurize the brake fluid in the wheel cylinder 24 by bringing the inlet valve 31 into the open state from the closed state and thus to brake the vehicle 100A according to the rider's intention.

In the case where the brake operation is performed by the rider of the vehicle 100A during the execution of the diagnostic mode, which is executed during the travel of the vehicle 100A, the diagnosis section 522*b* may bring the first valve 37 into the open state from the closed state in addition to the inlet valve 31. In this way, it is possible to pressurize the brake fluid in the wheel cylinder 24 according to the brake operation by the rider. Thus, the vehicle 100A can be braked by the brake operation by the rider.

For example, in the case where the brake operation by the rider of the vehicle 100A is expected during the execution of the diagnostic mode, which is executed during the travel of the vehicle 100A, the diagnosis section 522*b* brings the inlet valve 31 into the open state from the closed state. For example, in the case where the vehicle 100A approaches a target in front (for example, a preceding vehicle, an obstacle other than a vehicle, or the like), the diagnosis section 522*b* can determine that the brake operation by the rider is expected. For example, the diagnosis section 522*b* can determine whether the vehicle 100A has approached the target in front on the basis of a detection result of a surrounding environment sensor that is provided to the vehicle 100A. In the case where the brake operation by the rider is expected, necessity of braking the vehicle 100A is increased. In such a case, it is possible to pressurize the brake fluid in the wheel cylinder 24 by bringing the inlet valve 31 into the open state from the closed state and thus to brake the vehicle 100A under a situation where the necessity of braking the vehicle 100A is high.

In the case where the brake operation by the rider of the vehicle 100A is expected during the execution of the diagnostic mode, which is executed during the travel of the vehicle 100A, the diagnosis section 522*b* may bring the first valve 37 into the open state from the closed state in addition to the inlet valve 31. In this way, it is possible to pressurize the brake fluid in the wheel cylinder 24 according to the brake operation by the rider. Thus, the vehicle 100A can be braked by the brake operation by the rider.

[Effects]

A description will be made on effects of the hydraulic pressure control unit 5A according to the second embodiment of the present invention.

In the hydraulic pressure control unit 5A, in the diagnostic mode, the diagnosis section 522*b* drives the pump 34 by the motor 35 in the state where the first valve 37 is closed and the second valve 38 is opened. In this way, in the diagnostic mode, the channel on the discharge side of the pump 34 is pressurized when the hydraulic pressure control mechanism 51A is normal, and the channel on the discharge side of the pump 34 is not pressurized when the hydraulic pressure control mechanism 51A is abnormal. Accordingly, it is possible to change the magnitude of the load acting on the motor 35 between the case where the hydraulic pressure control mechanism 51A is normal and the case where the hydraulic pressure control mechanism 51A is abnormal. Therefore, it is possible to appropriately diagnose the presence or the absence of the abnormality in the hydraulic pressure control mechanism 51A according to the load acting on the motor 35.

Preferably, in the hydraulic pressure control unit 5A, in the diagnostic mode, the diagnosis section 522*b* drives the pump 34 by the motor 35 in the state where the inlet valve 31 is closed. In this way, it is possible to suppress braking of the vehicle 100A that contradicts the rider's intention. Therefore, the safety is improved.

In the diagnostic mode of the hydraulic pressure control unit 5 according to the above-described first embodiment, similar to the second embodiment, the diagnosis section 522*b* may drive the pump 34 by the motor 35 in the state where the inlet valve 31 is closed.

Preferably, in the hydraulic pressure control unit 5A, in the case where the brake operation is performed by a driver (more specifically, the rider) of the vehicle 100A during the execution of the diagnostic mode, which is executed during the travel of the vehicle 100A, the diagnosis section 522*b* brings the inlet valve 31 into the open state from the closed state. In this way, it is possible to pressurize the brake fluid in the wheel cylinder 24 and thus to brake the vehicle 100A according to the rider's intention.

In the diagnostic mode of the hydraulic pressure control unit 5 according to the above-described first embodiment, similar to the second embodiment, in the case where the brake operation is performed by a driver (more specifically, the rider) of the vehicle 100 during the execution of the diagnostic mode, which is executed during the travel of the vehicle 100, the diagnosis section 522*b* may bring the inlet valve 31 into the open state from the closed state.

Preferably, in the hydraulic pressure control unit 5A, in the case where the brake operation by the driver (more specifically, the rider) of the vehicle 100A is expected during the execution of the diagnostic mode, which is executed during the travel of the vehicle 100A, the diagnosis section 522*b* brings the inlet valve 31 into the open state from the closed state. In this way, it is possible to pressurize the brake fluid in the wheel cylinder 24 and thus to brake the vehicle 100A under the situation where the necessity of braking the vehicle 100A is high.

In the diagnostic mode of the hydraulic pressure control unit 5 according to the above-described first embodiment, similar to the second embodiment, in the case where the brake operation by the driver (more specifically, the rider) of the vehicle 100 is expected during the execution of the diagnostic mode, which is executed during the travel of the vehicle 100, the diagnosis section 522*b* may bring the inlet valve 31 into the open state from the closed state.

The present invention is not limited to the embodiments that have been described. For example, only a part of each of the embodiments may be implemented. Alternatively, the examples in the embodiments may be combined.

REFERENCE SIGNS LIST

1: Trunk
2: Handlebar
3: Front wheel
3*a*: Rotor
4: Rear wheel
4*a*: Rotor
5: Hydraulic pressure control unit
5A: Hydraulic pressure control unit
6: Notification device
10: Brake system
10A: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
25*a*: Intermediate portion
26: Secondary channel
27: Supply channel
31: Inlet valve
32: Outlet valve
33: Accumulator
34: Pump
35: Motor
36: Eccentric cam section
37: First valve
38: Second valve
41: Current sensor
51: Hydraulic pressure control mechanism
51*a*: Base body
51A: Hydraulic pressure control mechanism
52: Controller
52A: Controller
100: Vehicle
100A: Vehicle
341: Plunger
342: Spring
351: Output shaft
361: Cam member
362: Rolling bearing
521: Acquisition section
522: Control section
522*a*: Braking control section
522*b*: Diagnosis section
i: Current value
i1: Current value
i1': Current value
i2: Current value
i2': Current value
P: Pressure
P1: Pressure
P2: Pressure
PP: Pressurized portion
RA: Reference amplitude
θ: Rotation angle

The invention claimed is:

1. A hydraulic pressure control unit (5, 5A) used for a brake system (10, 10A) of a vehicle (100, 100A), the hydraulic pressure control unit comprising:

a hydraulic pressure control mechanism (51, 51A) including an inlet valve (31) that is provided to a primary channel (25) communicating a master cylinder (21) and a wheel cylinder (24), an outlet valve (32) that is provided to a secondary channel (26) through which a hydraulic fluid in the wheel cylinder (24) is released to an intermediate portion (25*a*) of the primary channel (25), a pump (34) that is provided on a downstream side of the outlet valve (32) in the secondary channel (26), and a motor (35) that drives the pump (34); and a controller (52, 52A) that controls operation of the hydraulic pressure control mechanism (51, 51A), wherein the controller (52, 52A) includes a diagnosis section (522*b*) that executes a diagnostic mode to diagnose presence or absence of abnormality in the hydraulic pressure control mechanism (51, 51A) on the basis of a current fluctuation of the motor (35) in a state where the pump (34) is driven by the motor (35), wherein, in the diagnostic mode, the diagnosis section (522*b*) drives the pump (34) by the motor (35) in a state where the inlet valve (31) is closed, and wherein in the case where a brake operation is performed by a driver of the vehicle (100, 100A) during execution of the diagnostic mode, which is executed during travel of the vehicle (100, 100A), the diagnosis section (522*b*) brings the inlet valve (31) into an open state from a closed state.

2. The hydraulic pressure control unit according to claim 1, wherein in the diagnostic mode, the diagnosis section (522*b*) diagnoses presence or absence of fixation of the pump (34) as the presence or the absence of the abnormality in the hydraulic pressure control mechanism (51, 51A).

3. The hydraulic pressure control unit according to claim 1, wherein in the diagnostic mode, in the case where an amplitude of the current fluctuation of the motor (35) is smaller than a reference amplitude (RA), the diagnosis section (522*b*) diagnoses that the hydraulic pressure control mechanism (51, 51A) is abnormal.

4. The hydraulic pressure control unit according to claim 1, wherein in the diagnostic mode, the diagnosis section (522*b*) drives the pump (34) by the motor (35) in a state where the outlet valve (32) is closed.

5. The hydraulic pressure control unit according to claim 1, wherein in the case where a brake operation by a driver of the vehicle (100, 100A) is expected during execution of the diagnostic mode, which is executed during travel of the vehicle (100, 100A), the diagnosis section (522*b*) brings the inlet valve (31) into an open state from a closed state.

6. The hydraulic pressure control unit according to claim 1, wherein the hydraulic pressure control mechanism (51A) further includes:

a first valve (37) that is provided on the master cylinder (21) side of the intermediate portion (25*a*) in the primary channel (25); and a second valve (38) that is provided to a supply channel (27) through which the hydraulic fluid in the master cylinder (21) is supplied to a portion between the outlet valve (32) and the pump (34) in the secondary channel (26), and in the diagnostic mode, the diagnosis section (522*b*) drives the pump (34) by the motor (35) in a state where the first valve (37) is closed and the second valve (38) is opened.

7. The hydraulic pressure control unit according to claim 1, wherein the diagnosis section (522*b*) controls notification operation on the basis of a diagnosis result in the diagnostic mode.

8. The hydraulic pressure control unit according to claim 1, wherein the vehicle (100, 100A) is a motorcycle.

* * * * *